UNITED STATES PATENT OFFICE.

JOSEPH A. AMBLER, OF NORWICH, CONNECTICUT, AND HARRY D. GIBBS, OF SAN FRANCISCO, CALIFORNIA.

PROCESS FOR THE MANUFACTURE OF TOLUENE SULFONIC ACIDS.

1,292,950.      Specification of Letters Patent.      Patented Jan. 28, 1919.

No Drawing.      Application filed January 26, 1918. Serial No. 213,976.

(FILED UNDER THE ACT OF MARCH 3, 1883, 22 STAT. L., 625.)

*To all whom it may concern:*

Be it known that we, JOSEPH A. AMBLER and HARRY D. GIBBS, citizens of the United States of America, employees of the Department of Agriculture of the said United States, residing in the city of Norwich, county of New London, State of Connecticut, and in the city of San Francisco, county of San Francisco, State of California, respectively, (whose post-office address is Washington, D. C.,) have jointly invented a new and useful Process for the Manufacture of Toluene Sulfonic Acids.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty thereon.

Heretofore various methods for manufacturing the sulfonic acids of toluene have been employed, among which are the following:

(1) By adding the toluene to sulfuric acid, or to sulfuric acid containing sulfur trioxid, under suitable temperature control and with various methods of agitation and mixing.

(2) By passing the vapors of toluene into a vessel of heated sulfuric acid.

(3) By adding sulfuric acid to boiling toluene.

It is well known that the product formed when toluene is sulfonated depends on the temperature of the reaction, the strength of the acid and the duration of the heating; as, for example, when toluene is sulfonated at less than 100° centigrade, a mixture of the ortho and para sulfonic acids is obtained; when toluene is sulfonated at its boiling temperature, the product is mainly para sulfonic acid; while at 240° to 250° centigrade, the product is mainly the disulfonic acid.

We have found that when toluene is sulfonated in the gaseous state and the product removed rapidly from the reaction vessel, much less sulfuric acid is necessary for sulfonation.

We shall illustrate our invention by describing the process for the manufacture of toluene-para-sulfonic acid and toluene-disulfonic acid, although the invention is not restricted to this particular sulfonic acid.

I. Sulfuric acid of specific gravity 1.84 is caused to descend over baffle-plates, pebbles or coarse pumice stones, in a tower, which is heated and maintained at a temperature of 150° centigrade. Toluene is heated to boiling and its vapors are passed up through the tower. The vapors come into contact with the descending hot sulfuric acid and are completely absorbed by it, with the formation of water and toluene sulfonic acids. The water escapes from the tower as steam and may be condensed in any suitable condenser attached at or near the top of the tower. The sulfonic acids, together with a slight excess of unused sulfuric acid, are carried downward by means of gravity, and discharged from the bottom of the tower.

II. Sulfuric acid of specific gravity 1.84 is caused to descend over baffle-plates, pebbles or coarse pumice stones, in a tower, which is heated and maintained at a temperature of 240° to 250° centigrade. Toluene is heated to boiling and its vapors are passed up through the tower. The vapors come into contact with the descending hot sulfuric acid and are completely absorbed by it, with the formation of water and a mixture of toluene sulfonic acids and toluene disulfonic acids. The water escapes from the tower as steam and may be condensed in any suitable condenser attached at or near the top of the tower. The sulfonic acids, together with a slight excess of unused sulfuric acid, are carried downward by means of gravity, and discharged from the bottom of the tower. The products are separated by well known means, and used for the manufacture of other derivatives of toluene.

Thus our invention is an improvement on existing methods of manufacture of toluene sulfonic acids, in that it is a continuous process and the products move in a continuous and automatic manner, and in that less sulfuric acid is required for the process.

It is obvious that other concentrations of sulfuric acid than that having specific gravity of 1.84 may be used, and that other temperatures than 150° centigrade and 240° to 250° centigrade may be used, and our invention is not restricted to such sulfuric acid, temperatures, or toluene sulfonic acids, but has a general application to the sulfonation of toluene in the gaseous state.

Having thus described our invention, we claim—

1. A continuous process for the manufacture of sulfonic acids of toluene by causing the vapors of toluene to mix with the vapors of sulfuric acid.

2. A continuous process for the manufacture of sulfonic acids of toluene by causing the vapors of toluene to come into contact with a descending current of sulfuric acid.

3. A continuous process for the manufacture of sulfonic acids of toluene by causing the vapors of toluene to come into contact with a descending current of sulfuric acid, heated and maintained at the temperature at which toluene boils.

4. A continuous process for the manufacture of sulfonic acids of toluene by causing the vapors of toluene to come into contact with a descending current of sulfuric acid, heated and maintained at a temperature above that at which toluene boils.

5. A continuous process for the manufacture of sulfonic acids of toluene by causing the vapors of toluene to rise through a tower in which a stream of sulfuric acid is descending over obstructions to break and retard its fall.

6. A continuous process for the manufacture of sulfonic acids of toluene by causing the vapors of toluene to rise through a tower in which a stream of sulfuric acid, heated and maintained at the temperature at which toluene boils, is descending over obstructions to break and retard its fall.

7. A continuous process for the manufacture of sulfonic acids of toluene by causing the vapors of toluene to rise through a tower in which a stream of sulfuric acid, heated and maintained at a temperature above that at which toluene boils, is descending over obstructions to break and retard its fall.

8. A continuous process for the manufacture of toluene para-sulfonic acid by causing the vapors of toluene to rise through a tower in which a stream of sulfuric acid, heated and maintained at the temperature at which toluene boils, is descending over obstructions to break and retard its fall.

9. A continuous process for the manufacture of toluene para-sulfonic acid by causing the vapors of toluene to rise through a tower in which a stream of sulfuric acid, heated and maintained at a temperature above that at which toluene boils, is descending over obstructions to break and retard its fall.

10. A continuous process for the manufacture of toluene ortho-sulfonic acid by causing the vapors of toluene to rise through a tower in which a stream of sulfuric acid, heated and maintained at the temperature at which toluene boils, is descending over obstructions to break and retard its fall.

11. A continuous process for the manufacture of toluene ortho-sulfonic acid by causing the vapors of toluene to rise through a tower in which a stream of sulfuric acid, heated and maintained at a temperature above that at which toluene boils, is descending over obstructions to break and retard its fall.

12. A continuous process for the manufacture of toluene disulfonic acid by causing the vapors of toluene to rise through a tower in which a stream of sulfuric acid, heated and maintained at a temperature above that at which toluene boils, is descending over obstructions to break and retard its fall.

13. A continuous process for the manufacture of sulfonic acids of toluene by causing the vapors of toluene to rise through a tower in which a partial vacuum is maintained while a stream of sulfuric acid, heated and maintained at the temperature at which toluene boils in said partial vacuum, is descending over obstructions to break and retard its fall.

14. A continuous process for the manufacture of toluene ortho-sulfonic acid by causing the vapors of toluene to rise through a tower in which a partial vacuum is maintained while a stream of sulfuric acid, heated and maintained at the temperature at which toluene boils in said partial vacuum, is descending over obstructions to break and retard its fall.

15. A continuous process for the manufacture of toluene ortho-sulfonic acid by causing the vapors of toluene to rise through a tower in which a partial vacuum is maintained while a stream of sulfuric acid, heated and maintained at a temperature above that at which toluene boils in said partial vacuum, is descending over obstructions to break and retard its fall.

In testimony whereof, we affix our signatures in the presence of two subscribing witnesses.

JOSEPH A. AMBLER.
HARRY D. GIBBS.

Witnesses:
L. A. SKINNER,
R. HELLBACH.